(12) United States Patent
Li et al.

(10) Patent No.: US 8,035,860 B2
(45) Date of Patent: *Oct. 11, 2011

(54) METHOD FOR PROCESSING FM-AM MIXED HALFTONE IMAGES ON A MULTI-BIT DEPTH IMAGING APPARATUS

(75) Inventors: Haifeng Li, Beijing (CN); Bin Yang, Beijing (CN)

(73) Assignees: Peking University Founder Group Co., Ltd., Beijing (CN); Beijing Founder Electronics Co., Ltd., Beijing (CN); Peking University, Beijing (CN)

( * ) Notice: Subject to any disclaimer, the term of this patent is extended or adjusted under 35 U.S.C. 154(b) by 623 days.

This patent is subject to a terminal disclaimer.

(21) Appl. No.: 12/091,290

(22) PCT Filed: Apr. 29, 2006

(86) PCT No.: PCT/CN2006/000856
§ 371 (c)(1),
(2), (4) Date: Apr. 23, 2008

(87) PCT Pub. No.: WO2007/048289
PCT Pub. Date: May 3, 2007

(65) Prior Publication Data
US 2008/0278765 A1 Nov. 13, 2008

(30) Foreign Application Priority Data

Oct. 26, 2005 (CN) .......................... 2005 1 0116635

(51) Int. Cl.
*H04N 1/405* (2006.01)
(52) U.S. Cl. ....................... 358/3.16; 358/3.06; 358/3.14
(58) Field of Classification Search ................. 358/3.06, 358/3.16, 3.14, 3.19
See application file for complete search history.

(56) References Cited

U.S. PATENT DOCUMENTS 5,832,122 A * 11/1998 Shimazaki .................... 382/237
6,271,936 B1 8/2001 Yu et al.
(Continued)

FOREIGN PATENT DOCUMENTS

CN 1668063 A 9/2005
(Continued)

OTHER PUBLICATIONS

Goldschneider, et al.; "Embedded Multilevel Error Diffusion"; SID 95 Digest; ; May 23-25, 1995; pp. 829-832; vol. 26; SID International Symposium Digest of Technical Papers; Santa Ana, SID U.S.; XP000657189.
(Continued)

*Primary Examiner* — Chan S Park
*Assistant Examiner* — Allen H Nguyen
(74) *Attorney, Agent, or Firm* — The Webb Law Firm

(57) ABSTRACT

Disclosed is a method for processing FM-AM mixed halftone images on a multi-bit depth imaging apparatus, which relates to a method for producing halftone dots in the field of image hard copying. In the prior art, since it is hard to avoid the impact of the error diffusion for the output apparatus to control the mixed dots with multi-bit imaging depth based on the error diffusion, the output of the mixed dots with multi-bit imaging depth cannot satisfy requirements of the apparatus. According to the method of the present invention, the dynamic algorithm for controlling the multi-bit mixed dots is used for screening based on the existing mixed screening process using dual-feedback error diffusion. Furthermore, multi-bit halftone images with high quality and rich gradations can be output by the multi-bit depth imaging apparatus. The method of the present invention can solve the phenomenon of sawtooth in the margins of the mixed dots output by the conventional single-bit apparatus and obtain the FM-AM mixed dots with the effect of high resolution and continuous gradations, which are output under low resolution.

11 Claims, 2 Drawing Sheets

U.S. PATENT DOCUMENTS

| | | |
|---|---|---|
| 6,912,068 B1 | 6/2005 | Hirota et al. |
| 7,554,699 B2 * | 6/2009 | Wang et al. .................. 358/3.28 |
| 2003/0035146 A1 * | 2/2003 | Yu et al. ....................... 358/3.14 |
| 2004/0085587 A1 * | 5/2004 | Broddin et al. .............. 358/3.06 |
| 2004/0130753 A1 | 7/2004 | Crounse |
| 2008/0285085 A1 * | 11/2008 | Li et al. ........................ 358/3.06 |

FOREIGN PATENT DOCUMENTS

| | | |
|---|---|---|
| EP | 0938064 A2 | 8/1999 |
| EP | 1909482 A1 | 4/2008 |
| EP | 1909482 A1 | 9/2008 |
| JP | 11146189 A | 5/1999 |
| JP | 2004172798 A | 6/2004 |

OTHER PUBLICATIONS

Broja, et al.; "Error Diffusion Concept for Multi-level Quantization"; Optics Communications; Nov. 1, 1990; pp. 280-284; vol. 79; No. 5; North-Holland Publishing Co.; Amsterdam, NL, XP022564810.

* cited by examiner

METHOD FOR PROCESSING FM-AM MIXED HALFTONE IMAGES ON A MULTI-BIT DEPTH IMAGING APPARATUS

FIELD OF THE INVENTION

The present invention relates to a method for producing halftone dots in the field of hard copying for image duplication, more particularly to a method for processing FM-AM mixed halftone images on a multi-bit depth imaging apparatus.

BACKGROUND OF THE INVENTION

The hard copying for image duplication generally relates to the screening and plate-making technology for printers and the advanced printing and plate-making device. The screening technology used for duplicating an image with hard copying is also called the digital image halftone technology. The digital image halftone technology comprises amplitude-modulation (AM) screening and frequency-modulation (FM) screening. The amplitude-modulation screening technique is also called ordered dithering of gathered dots, characterizing in that, the colored points in a produced halftone image are gathered in pairs geometrically to form clusters of colored regions called dots. Since the technology controls the size of the dots to represent the gray level of the original image, the dots are called amplitude-modulation dots.

For the mixed screening technology based on the FM and AM screens, the applicants have filed a Chinese Patent Application "method for frequency-modulation screening using error diffusion based on dual-feedback" (Application No. 200510068127.8, published on Sep. 14, 2005), wherein the disclosed technology of FM-AM mixed dots is mainly based on the apparatus with single-bit imaging depth. During the practical output, since the single-bit apparatus has only two gradations (white: 255; black: 0) for outputting dots, the phenomenon of sawtooth exists generally in the margins of the FM-AM mixed dots output by the single-bit depth imaging apparatus, especially in the margins of characters. Furthermore, because of the AM feature of the mixed dots, the aggravation of image sharpening due to the size of the dots results in severe granular sensation and texture in the image output by the single-bit depth imaging apparatus so as to impact the smoothness in the whole image and the quality of the output image.

To overcome the shortcomings of the single-bit depth imaging apparatus, the multi-bit depth imaging apparatus appears. The output gradations of the apparatus are increased up to the power of 2 depending on the imaging depth. The general 2-bit or 4-bit output apparatus can represent 4 or 16 gradations respectively. The final object of the multi-bit depth imaging apparatus is to obtain the output effect with high resolution under low resolution so as to overcome the problem of imaging quality under low resolution. Furthermore, in combination with the PWM gradation offset technology embedded in the multi-bit depth imaging apparatus, the halftone dots are output stably and the optimized quality of the halftone dots output by the apparatus is obtained.

In the field of hard copying, the halftone screening technology adapted to the multi-bit depth imaging apparatus is mainly the AM screening technology. Since the AM dots have inherent regular distribution and the size of the dots has controllability, it is easy for the conventional AM screening technology with single-bit depth to evolve corresponding screening technology with multi-bit depth adapted to the multi-bit depth imaging apparatus.

In the application "method for frequency-modulation screening using error diffusion based on dual-feedback" based on the error diffusion, it is hard to deduce the dot generation technology with multi-bit depth due to the real-time dynamic halftone screening, the randomicity of distribution of the dots and the random change of controlling the shape of the dots in different positions. No effective methods for generation are existing and the conventional methods are needed to be improved.

SUMMARY OF THE INVENTION

To overcome the shortcomings of the prior art, the present invention is to provide a method for processing FM-AM mixed halftone images on the multi-bit depth imaging apparatus. The method relates to the technology of generating FM-AM mixed dots with multi-bit imaging depth based on the error diffusion. The technology of generating multi-bit dots is induced based on the conventional technology of generating mixed dots so that the conventional FM-AM mixed dots have the features of multi-bit imaging depth. Therefore, the multi-bit FM-AM mixed dots can be output by the multi-bit depth imaging apparatus so as to effectively utilize the advantage of the multi-bit depth imaging apparatus and improve the output quality of the mixed dots.

In order to accomplish the above object, the present invention provides a method for processing FM-AM mixed halftone images on the multi-bit depth imaging apparatus, the method comprising:

1) dividing averagely an interval [0, 255] into $2^n-1$ gradations in light of a bit depth n of the apparatus:
$[0, R_1], (R_1, R_2], \ldots, (R_{i-1}, R_i], \ldots (R_{2-2}^n, 255]$, wherein corresponding ranges of a dot-matrix of bit-outputting are
$(0, Out_1), (Out_1, Out_2), \ldots, (OUt_{i-1}, Out_i), \ldots (Out_{2-2}^n, 11 \ldots 1)$, the $Out_i$ being a binary representation of the n-bit depth, and
a threshold $M_i$ of a central point of each of the gradations is sampled as a threshold comparison parameter for the gradation;

2) setting output probability thresholds with a n-bit imaging depth in the interval [0, 255];
wherein the step 2) further comprises
setting $2^n-2$ integers $L_1, L_2, \ldots, L_i, \ldots, L_{2-2}^n$ as the output probability thresholds with the n-bit imaging depth, and
adjusting the probability thresholds based on requirements of the apparatus;

3) processing respectively the dots in the $2^n-1$ gradations $(R_{i-1}, R_i)$ based on an FM-AM mixed screening process using a dual-feedback error diffusion; the detailed process comprises:

(a) carrying out an operation T of a threshold comparison on a final input value g"(m, t) of a current pixel of an original image, and then converting a result of the operation to a corresponding value b(m, t) of the current pixel for a halftone image;
wherein the step (a) uses a process of bidirectional scanning when the original image is scanned, wherein, when a certain row is scanned from left to right, a next row is subsequently scanned from right to left;

(b) comparing the value b(m, t) of the pixel with an input value g'(m, t) of the same pixel to obtain a difference between b(m, t) and g'(m, t), wherein the difference is an error value e(m, t), and the input value g'(m, t) is used for obtaining the threshold;

(c) multiplying the error value e(m, t) by preset weight distribution coefficients through an error diffusion filter e and then diffusing results of the multiplying to unprocessed pixels around the current pixel, wherein each of the diffused results to the unprocessed pixels around the current pixel is weightedly added to an original input value g(m, t) of the corresponding pixel of the original image to obtain an input value g'(m, t) of the corresponding pixel of the original image;

wherein, further, the error diffusion filter e uses a diffusion principle and weight distribution coefficients as below:

$$\begin{array}{ccccc} & & ** & d_5 & d_3 \\ d_2 & d_4 & d_5 & d_4 & d_2 \\ d_1 & d_2 & d_3 & d_2 & d_1 \end{array}$$

wherein, ** represents the current pixel's position, each of arithmetic ratios on other positions represents the diffusion weight coefficient relative to the current pixel, and the diffusion weight coefficients are taken in [0, 1] and satisfy an expression as below:

$$2d_1+4d_2+2d_3+2d_4+2d_5 \in [0,1];$$

(d) diffusing processed results to corresponding unprocessed pixels surrounding the current pixel, respectively, and weightedly adding each of the diffused processed results to the original input value g(m, t) of the corresponding pixel of the original image to obtain the final input value g''(m, t) of the corresponding pixel, wherein the processed results are obtained by implementing a multiplying operation on the output value b(m, t) of the current pixel using a diffusion filter w and processing results of the multiplying operation with a dithering algorithm, and the step (d) is implemented in parallel with the steps (b) and (c);

wherein, further, a diffusion mode of the diffusion filter w is set as:

$$\begin{array}{ccc} & ** & w_0 \\ w_3 & w_2 & w_1 \end{array}$$

wherein, a scanning direction is from left to right, ** represents the current pixel's position, each of parameters on other positions represents the diffusion weight coefficient relative to the current pixel, the parameters are taken in [0, 1] and satisfy an expression as below:

$$w_{sum}=(w_0+w_1+w_2+w_3) \in [0,1];$$ and the dithering algorithm for the diffusion filter w in the step (d) are as below:

$$fRand=(R(m,t)/R\_MAX-0.5) \times cDither$$

$$dw_0=w_0-fRand$$

$$dw_2=w_2+fRand$$

$$dw_1=w_1+fRand$$

$$dw_3=w_3-fRand$$

wherein, fRand is a parameter for fine adjusting dithering; R(m, t) is a parameter with random value for scanning the current dot; R_MAX is a maximum of a random parameter R(i); cDither is a parameter for adjusting amplitude of dithering and determines the performance of amplitude-modulation; and $dw_0$~$dw_3$ are the diffusion weight coefficients of the diffusion filter w in different directions after dithering; and (e) repeating the steps (a)-(d) until the original input values g(m, t) of all pixels are processed; and 4) computing dynamically output dot-matrix data, by using a known dynamic gradation-changeable output mechanism and a dynamic statistic algorithm with adjacent output gray levels in light of the probability thresholds $F_i$ and an accumulated value ShapeCur for controlling the shape of a current dot, to control the shapes of the dots, when mixed screening in the gradations ($R_{i-1}$, $R_i$) is achieved;

wherein the dynamic gradation-changeable output mechanism in the step 4) comprises:

generating a pseudo-random value of the current dot in light of ShapeCur:

$$F_i=\text{random}(\text{ShapeCur}) \qquad \text{Formula 1}$$

wherein, the pseudo-random function random is to be generated automatically in a compiling environment, $F_i \in [0, 255]$; and the output dot-matrix data are computed dynamically:

$$OUT = \begin{cases} I_1 = \begin{cases} 0 \ldots F_i \in [0, L_1] \\ Out_1 \ldots F_i \in (L_1, L_2] \\ \ldots \\ Out_{i-1} \ldots F_i \in (L_{i-2}, L_{i-1}] \end{cases} \\ I_2 = \begin{cases} Out_i \ldots F_i \in (L_{i-1}, L_i] \\ Out_{i+1} \ldots F_i \in (L_i, L_{i+1}] \\ \ldots \\ 11 \ldots 1 \ldots F_i \in (L_{2^n-2}, 255] \end{cases} \end{cases} \qquad \text{Formula 2}$$

The present invention has the following effects. According to the method of the present invention, the multi-bit mixed halftone dots can be generated in light of the depth of imaging of the apparatus on the basis of the conventional method of FM-AM mixed screening by using error diffusion based on dual-feedback, so as to utilize the multi-bit imaging apparatus effectively. Furthermore, the FM-AM mixed halftone screening with the effect of high resolution can be obtained under low resolution. The method of the present invention optimizes the phenomenon of sawtooth in the margins of the dots, solves the problem of unsmoothness in the margins of characters, improves the output gradations of the dots and assures the continuous smoothness of the gradations.

DESCRIPTION OF THE PREFERRED EMBODIMENTS

Hereinafter, a detailed description of the present invention will be given with reference to the appended drawings and embodiments.

Figure 1:
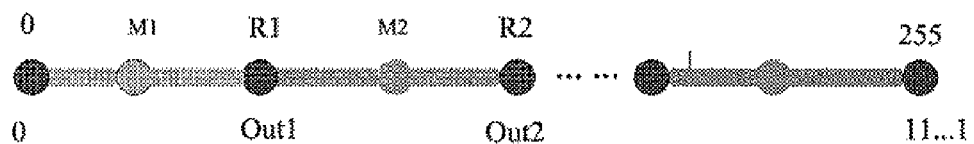
FIG. 1 illustrates the principle of the mixed halftone screening with multi-bit (n-bit) imaging depth.

The present invention provides a method for processing FM-AM mixed halftone images on the multi-bit depth imaging apparatus, which uses a dynamic algorithm for controlling dots with multi-bit depth (as shown in FIG. 1), In this embodiment, the 2-bit depth imaging apparatus (n=2) is used. The detailed solution is described as below.

Figure 2:
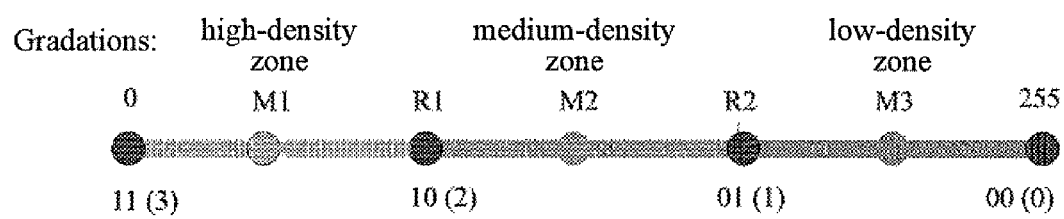
FIG. 2 illustrates the partition of the zones of the 2-bit mixed dots.

Step 1 (as shown in FIG. 2) is to averagely divide the interval [0-255] into three gradations (because the bit depth n of the apparatus is 2 and $2^n-1=3$);

[0, 84], (84, 171] and (171, 255].

The corresponding ranges of a dot-matrix of bit-outputting are (11, 10), (10 01) and (01, 00).

For the practical output in the embodiment, the pure black is set as 0 and the pure white is set as 255.

The thresholds $M_i$ ($M_1=42$, $M_2=127$ and $M_3=212$) of the central points of the three gradations are sampled as threshold comparison parameters for their respective gradations.

Step 2 is to set two (because $2^n-2=2$) integers $F_1=8$ and $F_2=24$ as output probability thresholds with the n-bit imaging depth in the interval [0, 255]. The output probabilities of 11, 10, 01 and 00 are influenced by the thresholds so as to obtain the effect of output of 2-bit mixed dots.

Step 3 is to respectively process the dots in the three gradations based on the known FM-AM mixed screening method using the dual-feedback error diffusion. The detailed process is described as below.

(a) The original image is scanned and input. An operation T of a threshold comparison is carried out on the pixel value g"(m, t) of the current pixel in the original image. The result of the operation is converted to the corresponding value b(m, t) of the current pixel for a halftone image.

In order to avoid the interference phenomenon caused by the scanning direction and the frequency of the dots with random distribution (popularly called "Moire"), the embodiment uses a bidirectional scanning method for scanning the data of the original pixels.

(b) The value b(m, t) of the current pixel is compared with the input value g'(m, t) of the current pixel to obtain the difference (i.e. an error value e(m, t)) between b(m, t) and g'(m, t).

(c) The error value e(m, t) is multiplied by certain weight distribution coefficients through an diffusion filter e. Then, the results of multiplying are diffused to those unprocessed pixels around the current pixel. Each of the diffused results to the unprocessed pixels around the current pixel is weightedly added to the original input value g'(m, t) of the corresponding pixel of the original image to obtain an input value g'(m, t) of the corresponding pixel. The error diffusion filter uses a diffusion principle and weight distribution coefficients as below:

$$\begin{array}{ccccc} & & ** & d_5 & d_3 \\ & d_2 & d_4 & d_5 & d_4 & d_2 \\ & d_1 & d_2 & d_3 & d_2 & d_1 \end{array}$$

wherein, ** represents the current pixel's position and each of the arithmetic ratios on the other positions represents the diffusion weight coefficient relative to the current pixel. In the embodiment, the coefficients are set as:

$d_1=1/44$, $d_2=2/44$, $d_3=5/44$, $d_4=4/44$, $d_5=8/44$.

The steps (b) and (c) accomplish the first diffusion feedback operation and implement the basic principle of error diffusion.

(d) This step is implemented in parallel with the steps (b) and (c). Processed results are respectively diffused to corresponding unprocessed pixels surrounding the current pixel, and each of the diffused processed results and each of the parameters of error diffusion in the steps (b) and (c) are weightedly added to the original input value g(m, f) of the corresponding pixel of the original image to obtain the final input value g"(m, t) of the corresponding pixel, wherein the processed results are obtained by implementing a multiplying operation on the output value b(m, i) of the current pixel using the second diffusion filter w and processing the results of the multiplying operation with the dithering algorithm. The diffusion mode of the second diffusion filter w is set as:

$$\begin{array}{ccc} & ** & w_0 \\ w_3 & w_2 & w_1 \end{array}$$

wherein, the scanning direction is from left to right, ** represents the current pixel's position and each of the parameters on the other positions represents the diffusion weight coefficient relative to the current pixel. The parameters are taken in [0, 1] and satisfy the following expression:

$w_{sum}=(w_0+w_1+w_2+w_3)\epsilon[0,1]$.

The dithering algorithm in the embodiment uses the following Formula:

$f$Rand$=(R(m,t)/R\_MAX-0.5)\times c$Dither $dw_0=w_0-f$Rand $dw_2=w_2+f$Rand $dw_1=w_1+f$Rand $dw_3=w_3-f$Rand In this Formula, fRand is a parameter for fine adjusting dithering; R(m, t) is a parameter with random value for scanning the current dot; R_MAX is the maximum of the random parameter R(i); cDither is a parameter for adjusting amplitude of dithering and determines the performance of amplitude-modulation; and $dw_0$~$dw_3$ are the diffusion weight coefficients of the filter w in different directions after dithering.

This step (d) accomplishes the second diffusion feedback operation and implements the amplitude-modulation characteristic of the frequency-modulation screen.

In the embodiment, the coefficients are set as:

$w_0=w_2=0.175$, $w_1=w_3=0.025$, then $w_{sum}=0.4$ cDither=0.2

During screening, the size of the frequency-modulation halftone dots is changed by adjusting $w_{sum}$ and the shapes of the frequency-modulation halftone dots is controlled by adjusting the values of $w_0$~$w_3$.

(e) The steps (a)-(d) are repeated until the original input values g(m, n) of all the pixels are processed.

In step 4, the dynamic gradation-changeable output mechanism is used in light of the probability thresholds ($L_1=8$, $L_2=24$) and an accumulated value ShapeCur for controlling the shape of the current dot, when the mixed screening in the three gradations is achieved. The algorithm of this step uses the following formula (A pseudo-random value of the current dot is generated on the basis of ShapeCur and Formula I):

$$F = \text{random}(\text{ShapeCur})$$

wherein, the pseudo-random function random can be generated automatically in the compiling environment. ($F \in [0, 255]$)

Figure 3:
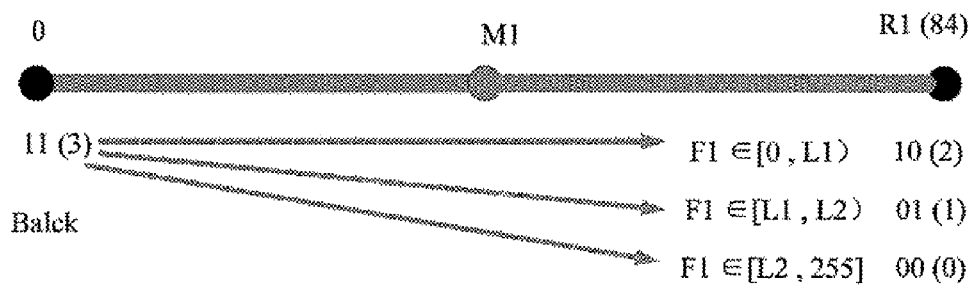
FIG. 3 illustrates the process for the 2-bit mixed dots in the high-density zone.
Figure 4:
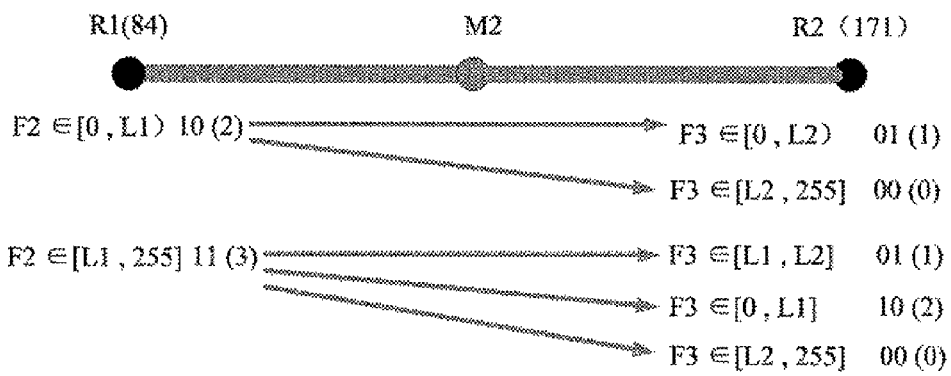
FIG. 4 illustrates the process for the 2-bit mixed dots in the medium-density zone.
Figure 5:
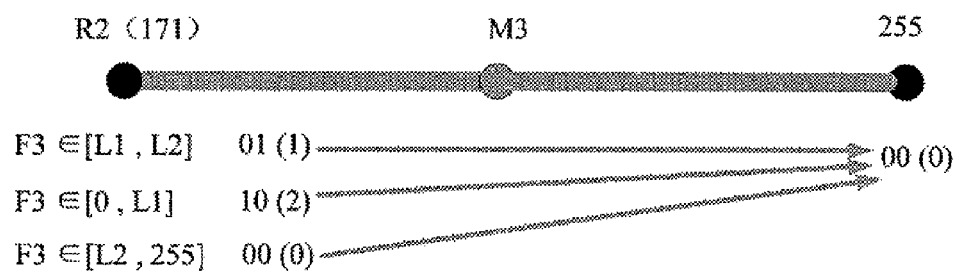
FIG. 5 illustrates the process for the 2-bit mixed dots in the low-density zone.

The output dot-matrix data are computed dynamically on the basis of Formula 2. The process in the zone [0, 84] is shown in FIG. 3, the process in the zone (84, 171] is shown in FIG. 4 and the process in the zone (171, 255] is shown in FIG. 5.

Figure 6:
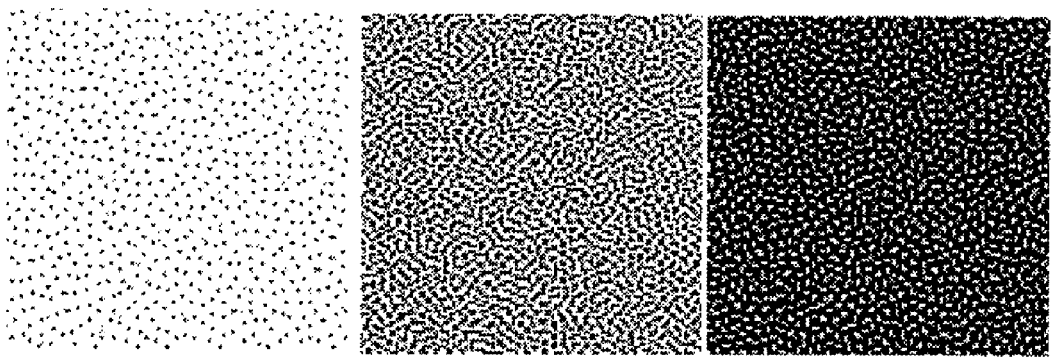
FIG. 6 shows the output effects of the 2-bit mixed dots.

Using the 2-bit depth imaging apparatus, the 2-bit FM-AM mixed screening can be achieved by implementing the above steps in this embodiment. FIG. 6 shows the effect of the screening.

The present invention is not limited to the embodiments mentioned above. Other embodiments obtained by the skilled in the art according to the technical solutions in the present invention should be within the scope of the technical innovation of the present invention.

The invention claimed is:

1. A method for processing FM-AM mixed halftone images on a multi-bit depth imaging apparatus, comprising:
   1) dividing averagely an interval [0, 255] into $2^n+1$ gradations in light of a bit depth n of the apparatus:
      $[0, R_1], (R_1, R_2], \ldots, (R_{i-1}, R_i], \ldots (R_{2-2}{}^n, 255]$, wherein i is a positive integer and less than $2^n-2$, corresponding ranges of a dot-matrix of bit-outputting are
      $(0, \text{Out}_1), (\text{Out}_1, \text{Out}_2), \ldots, (\text{Out}_{i-1}, \text{Out}_i), \ldots (\text{Out}_{2-2}{}^n, 11 \ldots 1)$,
   the $\text{Out}_i$ being a binary representation of the n-bit depth, and a threshold $M_i$ of a central point of each of the gradations is sampled as a threshold comparison parameter for the gradation;
   2) setting output probability thresholds with a n-bit imaging depth in the interval [0, 255];
   3) processing respectively the dots in the $2^n-1$ gradations $(R_{i-1}, R_i]$ based on an FM-AM mixed screening process using a dual-feedback error diffusion; and
   4) computing dynamically output dot-matrix data, by using a dynamic gradation-changeable output mechanism with adjacent output gray levels in light of the probability thresholds $F_i$ and an accumulated value ShapeCur for controlling the shape of a current dot, when mixed screening in the gradations $(R_{i-1}, R_i]$ is achieved.

2. The method of claim 1, wherein the step 2) further comprises
   setting $2^n-2$ integers $L_1, L_2, \ldots, L_i, \ldots, L_{2-2}{}^n$ as the output probability thresholds with the n-bit imaging depth, and adjusting the probability thresholds based on requirements of the apparatus.

3. The method of claim 1, wherein the step 3) further comprises:
   (a) carrying out an operation T of threshold comparison on a final input value g"(m, t) of a current pixel of an original image, and then converting a result of the operation to a corresponding value b(m, t) of the current pixel for a halftone image;
   (b) comparing the value b(m, t) of the current pixel with an input value g'(m, t) of the current pixel to obtain a difference between b(m, t) and g'(m, t), wherein the difference is an error value e(m, t), and the input value g'(m, t) is used for the operation T of threshold comparison;
   (c) multiplying the error value e(m, t) by preset weight distribution coefficients through an error diffusion filter e and then diffusing results of the multiplying to unprocessed pixels around the current pixel, wherein each of the diffused results to the unprocessed pixels around the current pixel is weightedly added to an original input value g(m, t) of the corresponding pixel of the original image to obtain an input value g'(m, t) of the corresponding pixel of the original image;
   (d) diffusing processed results to corresponding unprocessed pixels surrounding the current pixel, respectively, and weightedly adding each of the diffused processed results to the original input value g(m, t) of the corresponding pixel of the original image to obtain the final input value g"(m, t) of the corresponding pixel, wherein the processed results are obtained by implementing a multiplying operation on the output value b(m, t) of the current pixel using a diffusion filter w which has been processed with a dithering algorithm, and the step (d) is implemented in parallel with the steps (b) and (c); and
   (e) repeating the steps (a)-(d) until the original input values g(m, t) of all pixels are processed.

4. The method of claim 3, wherein the step (a) uses a process of bidirectional scanning when the original image is scanned, wherein, when a certain row is scanned from left to right, a next row is subsequently scanned from right to left.

5. The method of claim 4, wherein the error diffusion filter e uses a diffusion principle and a weight distribution mode as below:

| | | ** | $d_5$ | $d_3$ |
|---|---|---|---|---|
| | $d_2$ | $d_4$ | $d_5$ | $d_4$ | $d_2$ |
| $d_1$ | $d_2$ | $d_3$ | $d_2$ | $d_1$ | wherein, ** represents the current pixel's position, each of arithmetic ratios on other positions represents the diffusion weight coefficient relative to the current pixel, and the diffusion weight coefficients are taken in [0, 1] and satisfy an expression as below:

$$2 \times d_1 + 4 \times d_2 + 2 \times d_3 + 2 \times d_4 + 2 \times d_5 \in [0,1].$$

6. The method of claim 5, wherein a diffusion mode of the diffusion filter w is set as:

| | ** | $w_0$ |
|---|---|---|
| $w_3$ | $w_2$ | $w_1$ | wherein, a scanning direction is from left to right, ** represents the current pixel's position, each of parameters on other positions represents the diffusion weight coefficient relative to the current pixel, the parameters are taken in [0, 1] and satisfy an expression as below:

$$w_{sum} = (w_0 + w_1 + w_2 + w_3) \in [0,1].$$

7. The method of claim 6, wherein the dithering algorithm for the diffusion filter w in the step (d) are as below:

$$f\text{Rand} = (R(m,t)/R\_\text{MAX} - 0.5) \times c\text{Dither}$$

$$dw_0 = w_0 - f\text{Rand}$$

$$dw_2 = w_2 + f\text{Rand}$$

$$dw_1 = w_1 + f\text{Rand}$$

$$dw_3 = w_3 - f\text{Rand}$$

wherein, fRand is a parameter for fine adjusting dithering; R(m, t) is a parameter with random value for the current dot being scanned; R_MAX is a maximum of a random parameter R(i); cDither is a parameter for adjusting amplitude of dithering; and $dw_0 \sim dw_3$ are the diffusion weight coefficients of the diffusion filter w in different directions after dithering.

8. The method of claim 1, wherein the dynamic gradation-changeable output mechanism in the step 4) comprises:

generating a pseudo-random value of the current dot in light of ShapeCurr:

$$F_i = \text{random}(\text{ShapeCur}) \qquad \text{Formula 1}$$

wherein, the pseudo-random function random is to be generated automatically in a compiling environment, $F_i \in [0, 255]$; and the output dot-matrix data are computed dynamically:

$$OUT = \begin{cases} I_1 = \begin{cases} 0 \ldots F_i \in [0, L_1] \\ Out_1 \ldots F_i \in (L_1, L_2] \\ \ldots \\ Out_{i-1} \ldots F_i \in (L_{i-2}, L_{i-1}] \end{cases} \\ I_2 = \begin{cases} Out_i \ldots F_i \in (L_{i-1}, L_i] \\ Out_{i+1} \ldots F_i \in (L_i, L_{i+1}] \\ \ldots \\ 11 \ldots 1 \ldots F_i \in (L_{2^n-2}, 255] \end{cases} \end{cases} \qquad \text{Formula 2}$$

9. The method of claim 2, wherein the dynamic gradation-changeable output mechanism in the step 4) comprises:

generating a pseudo-random value of the current dot in light of ShapeCur:

$$F_i = \text{random}(\text{ShapeCur}) \qquad \text{Formula 1}$$

wherein, the pseudo-random function random is to be generated automatically in a compiling environment, $F_i \in [0, 255]$; and the output dot-matrix data are computed dynamically:

$$OUT = \begin{cases} I_1 = \begin{cases} 0 \ldots F_i \in [0, L_1] \\ Out_1 \ldots F_i \in (L_1, L_2] \\ \ldots \\ Out_{i-1} \ldots F_i \in (L_{i-2}, L_{i-1}] \end{cases} \\ I_2 = \begin{cases} Out_i \ldots F_i \in (L_{i-1}, L_i] \\ Out_{i+1} \ldots F_i \in (L_i, L_{i+1}] \\ \ldots \\ 11 \ldots 1 \ldots F_i \in (L_{2^n-2}, 255] \end{cases} \end{cases} \qquad \text{Formula 2}$$

10. The method of claim 3, wherein the dynamic gradation-changeable output mechanism in the step 4) comprises:

generating a pseudo-random value of the current dot in light of ShapeCur:

$$F_i = \text{random}(\text{ShapeCur}) \qquad \text{Formula 1}$$

wherein, the pseudo-random function random is to be generated automatically in a compiling environment, $F_i \in [0, 255]$; and the output dot-matrix data are computed dynamically:

$$OUT = \begin{cases} I_1 = \begin{cases} 0 \ldots F_i \in [0, L_1] \\ Out_1 \ldots F_i \in (L_1, L_2] \\ \ldots \\ Out_{i-1} \ldots F_i \in (L_{i-2}, L_{i-1}] \end{cases} \\ I_2 = \begin{cases} Out_i \ldots F_i \in (L_{i-1}, L_i] \\ Out_{i+1} \ldots F_i \in (L_i, L_{i+1}] \\ \ldots \\ 11 \ldots 1 \ldots F_i \in (L_{2^n-2}, 255] \end{cases} \end{cases} \qquad \text{Formula 2}$$

11. The method of claim 7, wherein the dynamic gradation-changeable output mechanism in the step 4) comprises:

generating a pseudo-random value of the current dot in light of ShapeCur:

$$F_i = \text{random}(\text{ShapeCur}) \qquad \text{Formula 1}$$

wherein, the pseudo-random function random is to be generated automatically in a compiling environment, $F_i \in [0, 255]$; and the output dot-matrix data are computed dynamically:

$$OUT = \begin{cases} I_1 = \begin{cases} 0 \ldots F_i \in [0, L_1] \\ Out_1 \ldots F_i \in (L_1, L_2] \\ \ldots \\ Out_{i-1} \ldots F_i \in (L_{i-2}, L_{i-1}] \end{cases} \\ I_2 = \begin{cases} Out_i \ldots F_i \in (L_{i-1}, L_i] \\ Out_{i+1} \ldots F_i \in (L_i, L_{i+1}] \\ \ldots \\ 11 \ldots 1 \ldots F_i \in (L_{2^n-2}, 255] \end{cases} \end{cases} \qquad \text{Formula 2}$$

\* \* \* \* \*

UNITED STATES PATENT AND TRADEMARK OFFICE
CERTIFICATE OF CORRECTION

PATENT NO.        : 8,035,860 B2
APPLICATION NO.   : 12/091290
DATED             : October 11, 2011
INVENTOR(S)       : Haifeng Li It is certified that error appears in the above-identified patent and that said Letters Patent is hereby corrected as shown below:

Column 7, Line 28, Claim 1, delete "2n+1" and insert -- 2n-1 --

Column 7, Line 33, Claim 1, delete "(Out2-2n," and insert -- (Out2n-2, --

Column 7, Line 52, Claim 2, delete "L2-2n" and insert -- L2n-2 --

Column 9, Line 2, Claim 7, delete "dot;" and insert -- dot --

Column 9, Line 10, Claim 8, delete "ShapeCurr:" and insert -- ShapeCur: --

Signed and Sealed this
Fourteenth Day of February, 2012

David J. Kappos
*Director of the United States Patent and Trademark Office*